United States Patent [19]
Vital et al.

[11] 3,843,267
[45] Oct. 22, 1974

[54] VARIABLE OPTICAL ATTENUATOR FOR A LIGHT SENSOR

[75] Inventors: Zoltan Vital, Brussels; Jean Orban, Clabecq, both of Belgium

[73] Assignee: Ponder & Best, Inc., Los Angeles, Calif.

[22] Filed: Jan. 26, 1973

[21] Appl. No.: 327,087

[30] Foreign Application Priority Data
Jan. 27, 1972 Belgium................................ 113276

[52] U.S. Cl.............. 356/225, 250/237 R, 350/266
[51] Int. Cl............................................. G01j 1/42
[58] Field of Search......... 356/225; 250/229, 287 R; 350/57, 65, 266

[56] References Cited
UNITED STATES PATENTS

| 178,391 | 6/1876 | Wale.................................... 350/266 |
| 3,447,862 | 6/1969 | Elpern................................ 250/229 |
| 3,715,149 | 2/1973 | Freeland.............................. 350/65 |

*Primary Examiner*—Vincent P. McGraw
*Attorney, Agent, or Firm*—Lyon & Lyon

[57] ABSTRACT

An optical device in the form of a light sensor having variable optical attenuation. Attenuation is accomplished by deforming a wall or diaphragm thereby causing a variation of the aperture provided thereby, without changing the angle or axis of the field of view of the sensor.

11 Claims, 4 Drawing Figures

PATENTED OCT 22 1974　　3,843,267

VARIABLE OPTICAL ATTENUATOR FOR A LIGHT SENSOR

CROSS REFERENCE TO RELATED APPLICATIONS

This application is related to U.S. Pat. application Ser. No. 244,279 filed Apr. 14, 1972 (a continuation of Ser. No. 799,554, filed Feb. 13, 1969, and now abandoned), U.S. Pat. application Ser. No. 17,634 filed Mar. 9, 1970, now U.S. Pat. No. 3,749,921, and U.S. Pat. application Ser. No. 174,096 filed Aug. 13, 1971, now U.S. Pat. No. 3,783,336. These applications disclose several circuits and devices for controlling impulses generated by the discharge of a capacitor associated with a load device, such as a photoflash device, and the disclosures of the above applications are incorporated herein by reference. The device of the present application, although having other potential uses, is particularly adapted for use with electronic photoflash devices of the nature disclosed in the above mentioned applications.

BACKGROUND OF THE INVENTION

The present invention relates to optical devices, and particularly to a device including a light sensor which permits the optical attenuation of light received by the sensor.

The device of the present invention will be described in the environment of electronic photoflash devices, although it is capable of use in other optical sensing applications. In recent years, electronic photoflash devices have incorporated various types of circuits and devices which were utilized to control flash duration. These devices represented a substantial improvement over previous non-automatic photoflash devices in which no control or minimum control of flash duration or total light output was possible. In such automatic systems, the light produced by the photoflash tube after being reflected from the subject being photographed is sensed by a light sensor and intergrated. When the total quantity of the light being sensed reaches a predetermined value or level, a signal is produced which results in termination of the light flash from the photoflash tube.

The present invention, as noted earlier, is directed to a device including a light sensor which enables optical attenuation of the light received by the light sensor. Such a device is useful as the light sensor portion of an associated electronic photoflash device and in other optical applications.

Accordingly, it is a principal object of the present invention to provide a new light sensor device having improved means for enabling variable optical attenuation.

A further object of this invention is to provide a light sensing device and an improved means for enabling variable optical attenuation of the light without utilizing optical focusing components.

Another object of this invention is to provide an optical attenuator for a light sensor wherein optical attenuation is accomplished continually over a relatively large range in an improved manner.

These and other objects of the present invention will become better understood through a consideration of the following description taken in conjunction with the drawings in which.

Figure 1:
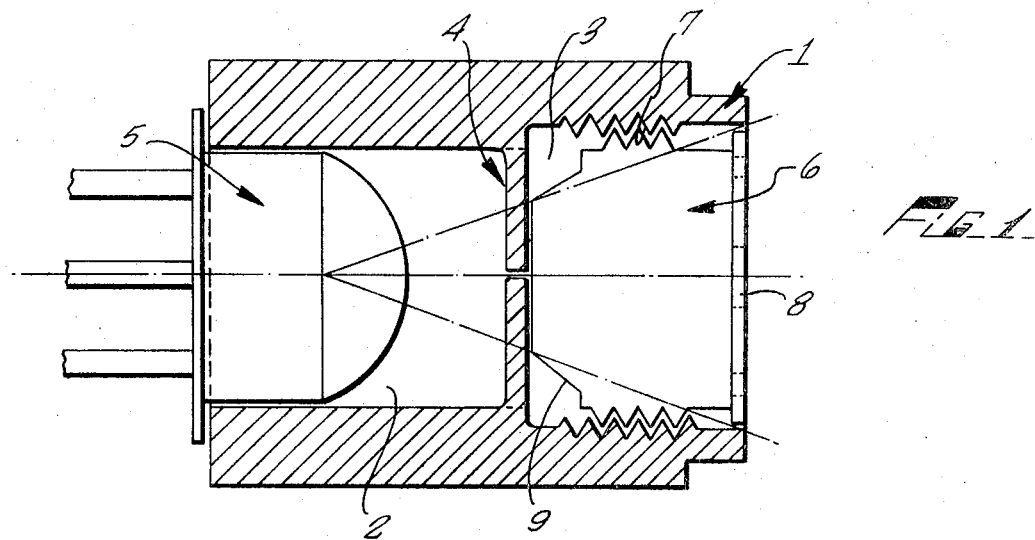
FIG. 1 is a cross-sectional elevational view of a device according to the present invention wherein the same is adjusted for maximum optical attenuation.
Figure 2:
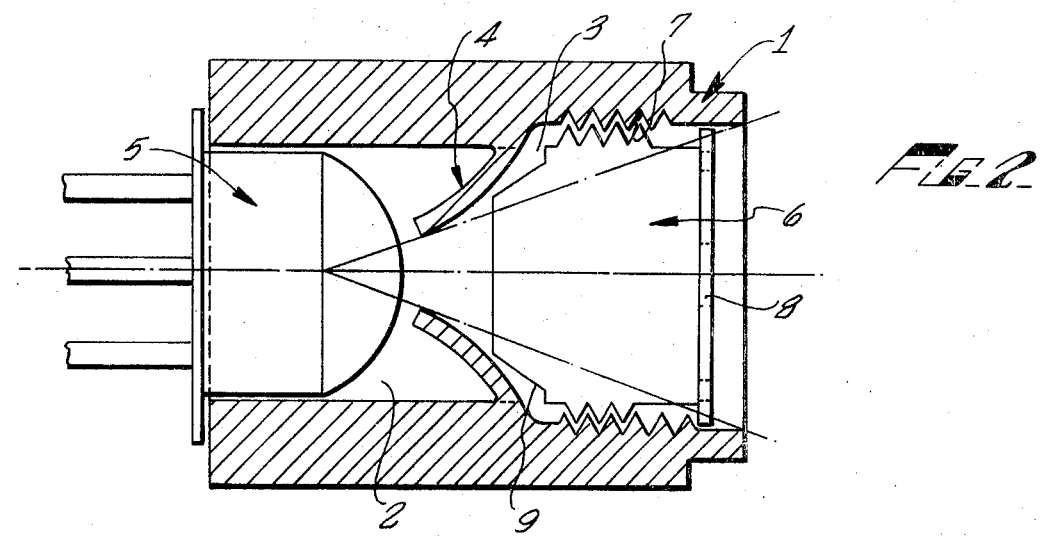
FIG. 2 is a view similar to FIG. 1 but wherein the device is adjusted for minimum optical attenuation.

Turning now to the drawings, FIGS. 1 and 2 illustrate an optical device according to the present invention employing a light sensor which through associated leads acts as an optical-to-electrical transducer when used in conjunction with an associated electronic photoflash device to control the flash duration. Further, a structural arrangement is disclosed which enables optically the attenuation of radiation energy such as light without modification of the angle of aperture or of the axis of the field of view. The optical attenuation may be realized in a continuous manner and over a relatively large range of attenuations. The device is constructed of a body 1 formed of an opaque material, such as plastic. The body 1 is preferably of a black or photoblack material to avoid stray light transmission. Polyamids, delrin and the like are suitable opaque plastic materials. The body 1 forms a first and second chamber or port 2 and 3 separated by an opaque and deformable member or wall 4. The deformable wall 4 is illustrated in its relaxed or maximum attenuation position in FIG. 1 and its flexed or minimum attenuation position in FIG. 2. Positions of the deformable wall 4 between that of minimum and maximum are achieved in a manner to be described subsequently. The deformable wall 4, in a preferred embodiment, is formed integrally with the body 1 to extend equidistant from the bottom and from the top of the body 1. The plurality of sections of the wall 4, although shown to be integrally molded or extruded with the body 1, may be separately manufactured and later assembled with the interior of body 1. However, the resulting wall should be flexible and deformable and return to a relaxed position when not being deformed.

The number of the sections comprising the wall 4 (whether integrally or separately assembled with the body 1) and the placement of the sections comprising the wall 4 in relation to the body 1 (whether on the top, bottom sides, exterior, etc.) is meant to be encompassed herein and an exemplary embodiment is described in FIGS. 3A and 3B to be discussed later.

A photosensitive element 5, such as a light sensor utilized as an optical-to-electric transducer, is disposed within the first chamber 2, and centered co-axially therein for receiving light from the exterior of the device through the second chamber 3 which passes the wall when the latter is open as indicated in FIG. 2.

The second chamber 3 is threaded as indicated at 7 and includes a member such as of a transparent filtering and/or clear material. The screw 6 is threaded into the second chamber 3, and is adjustable to deform the wall 4 into the first chamber 2. The deformation of the wall 4 and thus the amount of attenuation (between and including the maximum deformation in FIG. 2 and the minimum deformation in FIG. 1) is controlled by the penetration of the screw 6 within the second chamber 3. The outer surface of the screw 6 has a notch 8, similar to that of screwhead, which enables the use of an adjustment key in threading the screw 6 axially to deform the wall 4 into the first chamber 2. The rear end of the screw 6 (the end proximate to the first chamber 2) includes a surface which facilitates even deformation of the wall 4, such as that formed by the taper 9 (which may be frusto-conical) of the screw 6.

When the screw 6 is in the position shown in FIG. 1, the aperture is substantially equal to zero and the optical attenuation is at a maximum. When the screw 6 is threaded into the second chamber 3 in the manner illustrated in FIG. 2, the wall 4 moves to its maximum position of deformation and consequently the aperture is large and the optical attenuation is at a minimum.

Figure 3A:
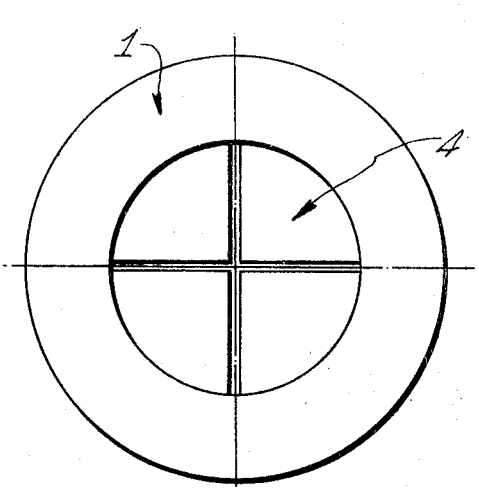
FIGS. 3A and 3B respectively are front views of the device of FIGS. 1 and 2.
Figure 3B:
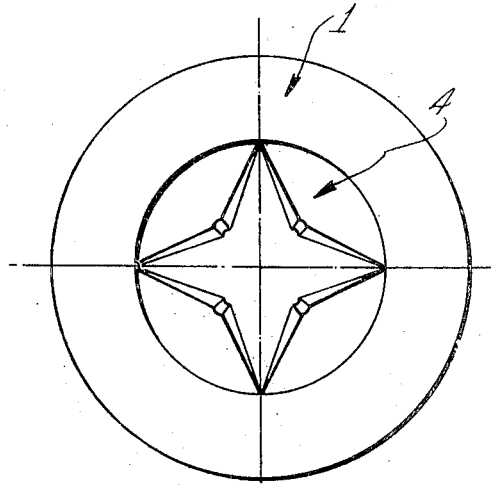

FIGS. 3A and B illustrate a front view of the wall 4 in the respective closed and opened positions corresponding to those shown in FIGS. 1 and 2. As can be seen in FIGS. 3A and 3B, the wall 4 is formed in an embodiment as four segments of a circle. When spread apart, a four pointed aperture is formed as seen in FIG. 3B.

While an embodiment and application of this invention has been shown and described, it will be apparent to those skilled in the art that many more modifications are possible without departing from the invention and concepts herein described. The invention, therefore, is not to be restricted except as is necessary by the prior art and by the spirit of the appended claims.

What is claimed as new and described to be secured by Letters Patent of the United States is:

1. An optical device for providing optical attenuation of received radiation for an associated optical-to-electrical transducer comprising:
    a body having first and second chambers, and a deformable member disposed between said first and second chambers, said first chamber being adapted to house an optical-to-electrical transducer, and said second chamber being adapted to receive radiation energy from the exterior of the optical device, and
    an optically transparent member disposed in said second chamber, and being movable therein for selectively deforming said deformable member for varying the attenuation of the radiation passing from said second to said first chamber without substantially changing the axis of the field of view.

2. The device as in claim 1 wherein said optically transparent member includes threads and is threaded into said second chamber, and has a surface for engaging and thereby deforming said deformable member.

3. The device as in claim 1 wherein the optical-to-electrical transducer is a light sensor and the radiation energy is light energy.

4. The device as in claim 1 wherein said body is formed of an opaque plastic.

5. The device as in claim 1 wherein said deformable wall is integrally formed with said body.

6. The device as in claim 4 wherein said deformable wall is integrally formed with said body.

7. The device as in claim 1 wherein said deformable member is a deformable wall.

8. The device as in claim 2 wherein said optically transparent member is a screw.

9. The device as in claim 8 wherein said optically transparent member includes a notch which allows said optically transparent member to axially deform said deformable member.

10. The device as in claim 1 wherein said wall member includes symmetrical sections.

11. The device as in claim 10 wherein said symmetrical sections form a generally shaped four pointed aperture when deformed.

* * * * *